United States Patent
French

(10) Patent No.: US 6,188,992 B1
(45) Date of Patent: Feb. 13, 2001

(54) APPARATUS, METHOD AND SYSTEM FOR ADAPTIVELY MANAGING INVESTMENTS

(76) Inventor: Fredric J. French, 1250 Truchas Trail, Bosque Farms, NM (US) 87068

( * ) Notice: Under 35 U.S.C. 154(b), the term of this patent shall be extended for 0 days.

(21) Appl. No.: 09/136,189

(22) Filed: Aug. 18, 1998

Related U.S. Application Data

(60) Provisional application No. 60/056,011, filed on Aug. 18, 1997.

(51) Int. Cl.[7] .................................................. G06F 16/60
(52) U.S. Cl. .............................. 705/35; 705/14; 705/35; 705/36; 705/37
(58) Field of Search ................................. 705/14, 37, 35, 705/36

(56) References Cited

U.S. PATENT DOCUMENTS

| | | | |
|---|---|---|---|
| 4,346,442 | 8/1982 | Musmanno | 364/408 |
| 4,376,978 | 3/1983 | Musmanno | 364/408 |
| 4,774,663 | 9/1988 | Musmanno et al. | 364/408 |
| 4,910,676 | 3/1990 | Alldredge | 364/408 |
| 5,193,056 | 3/1993 | Boes | 364/408 |
| 5,214,579 | 5/1993 | Wolberg et al. | 364/408 |
| 5,252,811 | 10/1993 | Henochowicz et al. | 235/379 |
| 5,297,026 | 3/1994 | Hoffman | 364/408 |
| 5,414,621 | 5/1995 | Hough | 364/401 |
| 5,644,727 | 7/1997 | Atkins | 395/240 |
| 5,745,706 | 4/1998 | Wolfberg et al. | 395/235 |
| 5,761,441 | 6/1998 | Bennett | 395/235 |
| 5,761,442 | 6/1998 | Barr et al. | 395/236 |
| 5,799,287 | 8/1998 | Dembo | 705/36 |
| 5,812,987 | 9/1998 | Luskin et al. | 705/36 |
| 5,819,238 | 10/1998 | Fernholz | 705/36 |

OTHER PUBLICATIONS

U.S. Ser. No. 9,606,402, Feb. 29, 1996, Knowles et al.*
M. Mitchel and Waldrop, "*Complexity: The Emerging Science at the Edge of Order and Chaos*", pp. 10–13, Simon & Schuster (1992), New York.
John H. Holland, "*Hidden Order: How Adaptation Builds Complexity*", pp. 65–80, 84–90, Addison–Wesley Publishing Company, Inc. (Jul. 25, 1995), Reading, Massachusetts.
Peter Coveney and Roger Highfield, "*Frontiers of Complexity: The Search for Order in a Chaotic World*", pp. xi–xii, 9, 253–259, 327, Fawcett Columbine (Sep. 22, 1995), New York.

* cited by examiner

*Primary Examiner*—James P. Trammell
*Assistant Examiner*—Mussie Tesfamariam
(74) *Attorney, Agent, or Firm*—Gardere & Wynne, L.L.P.; Daniel F. Perez; Daniel J. Chalker

(57) ABSTRACT

The present invention provides an apparatus, method and system for managing investments having one or more characteristics. The present invention creates three or more investment agents, each investment agent having one or more characteristics, and selects an investment for each investment agent by comparing the investment agent's one or more characteristics to the investment's one or more characteristics. The selected investment for each investment agent is then acquired if the selected investment is not currently owned by the investment agent. After a period of time has elapsed, the selected investments are managed by: evaluating the performance of each investment agents; eliminating each investment agent whose performance is less than a specified performance level; and creating one or more new investment agents, each new investment agent having one or more characteristics derived from two or more of the investment agents whose performance is equal to or greater than the specified performance level.

20 Claims, 7 Drawing Sheets

| Investment Agent | Investment "A" | | Investment "B" | | Investment "C" | |
|---|---|---|---|---|---|---|
| 1 | 1 | match | 1 | match | 0 | |
| 0 | 0 | match | 0 | match | 1 | |
| # | 0 | | 0 | | 1 | |
| 0 | 1 | | 0 | match | 0 | match |
| 1 | 0 | | 1 | match | 0 | |
| 1 | 1 | match | 0 | | 0 | |
| # | 1 | | 0 | | 1 | |
| # | 0 | | 1 | | 0 | |
| 1 | 1 | match | 1 | match | 1 | match |
| Total Matches | 4 | | 5 | | 2 | |

| Investment Agent One (220) | Investment Agent Two (222) | | New Investment Agent (224) |
|---|---|---|---|
| 1 | 1 | | 1 |
| 0 | 1 | dissimilar | 0 |
| # | 1 | dissimilar | # |
| 0 | 0 | | 0 |
| Cross Over Point (226) | | | |
| 1 | 0 | dissimilar | 0 |
| 1 | 0 | dissimilar | 0 |
| # | 0 | dissimilar | 0 |
| # | # | | # |
| 1 | # | dissimilar | # |

*Fig.8*

| New Investment Agent (230) | Mutation One (232) | Mutation Two (234) |
|---|---|---|
| 1 | 1 | 1 |
| 0 | 0 | 0 |
| # | # | # |
| 0 | 0 | 0 |
| 0 | 1 | # |
| 0 | 0 | 0 |
| 0 | 0 | 0 |
| # | # | # |
| # | # | # |

*Fig.9*

APPARATUS, METHOD AND SYSTEM FOR ADAPTIVELY MANAGING INVESTMENTS

This application claims the benefit of prior filed copending provisional patent application Ser. No. 60/056,011 filed on Aug. 18, 1997.

BACKGROUND OF THE INVENTION

Without limiting the scope of the present invention, this background of the present invention is described in connection with adaptively managing investments. The present invention, however, is not limited to the management of equity investments, such as stocks, and is applicable to the management of any type of investment that can be characterized by a series of measurable parameters.

Most computerized investment management systems select one or more specific investments and manage those investments based on quantifiable market conditions and trends. With the advent of computers and modern telecommunications, the amount of information that is available about a specific investment and the market as a whole at any given time is enormous. Accordingly, most investment management systems monitor and use only a selected portion of the available information to make investment decisions. For example, the change in an economic or market index, such as the Dow Jones Industrial Average or the Standard & Poors 500, may trigger an investment management system to automatically sell a certain percentage of its holdings. Moreover, the information monitored and the decisions based on that information are typically fixed within the investment management system. As a result, these systems only react to the market. And the information monitored or the decisions based on that information does not adapt to changes in the market, except through "human intervention."

SUMMARY OF THE INVENTION

Other features and advantages of the present invention shall be apparent to those of ordinary skill in the art upon reference to the following detailed description taken in conjunction with the accompanying drawings.

The present invention provides a method for managing investments having one or more characteristics. The present invention creates three or more investment agents, each investment agent having one or more characteristics, and selects an investment for each investment agent by comparing the investment agent's one or more characteristics to the investment's one or more characteristics. The selected investment for each investment agent is then acquired if the selected investment is not currently owned by the investment agent. After a period of time has elapsed, the selected investments are managed by: evaluating the performance of each investment agents; eliminating each investment agent whose performance is less than a specified performance level; and creating one or more new investment agents, each new investment agent having one or more characteristics derived from two or more of the investment agents whose performance is equal to or greater than the specified performance level.

The present invention also provides a computer program embodied on a computer-readable medium for managing three or more investments wherein each investment has one or more characteristics. The computer program has a code segment for creating three or more investment agents, each investment agent having one or more characteristics, and a code segment for selecting an investment for each investment agent by comparing the investment agent's one or more characteristics to the investment's one or more characteristics. The computer program also has a code segment for acquiring the selected investment for each investment agent if the selected investment is not currently owned by the investment agent. Moreover, the computer program has a code segment for managing the selected investments by evaluating the performance of each investment agent, eliminating each investment agent whose performance is less than a specified performance level, and creating one or more new investment agents, each new investment agent having one or more characteristics derived from two or more of the investment agents whose performance is equal to or greater than the specified performance level.

The present invention also provides a system for managing three or more investments, each investment having one or more characteristics. The system has a computer, a means for purchasing and selling the three or more investments, a communications link connecting the computer to the investment purchasing and selling means, a database communicably linked to the computer for storing three or more investment agents, each agent having one or more characteristics, and a computer program. The computer program is resident on the computer for creating the three or more investment agents, selecting an investment for each investment agent by comparing the investment agent's one or more characteristics to the investment's one or more characteristics, acquiring the selected investment for each investment agent if the selected investment is not currently owned by the investment agent, and managing the selected investments by evaluating the performance of each investment agent, eliminating each investment agent whose performance is less than a specified performance level, and creating one or more new investment agents, each new investment agent having one or more characteristics derived from two or more of the investment agents whose performance is equal to or greater than the specified performance level.

BRIEF DESCRIPTION OF THE DRAWINGS

The above and further advantages of the present invention may be better understood by referring to the following description in conjunction with the accompanying drawings, in which:

FIG. 8 is an example of the creation of a new investment agent from a pair of investment agents in accordance with a preferred embodiment of the present invention; and FIG. 9 is an example of the mutation of a new investment agent in accordance with a preferred embodiment of the present invention.

DETAILED DESCRIPTION OF THE INVENTION

The present invention provides an adaptive investment management system to manage investments, such as stocks, bonds, mutual funds, hedge funds, annuities or any other investment that can be characterized by a series of measurable parameters. The present invention is adaptive because it allocates portions of the total sum of money being invested to "agents" that compete with each other for survival and have the opportunity to pass one or more of the characteristics that have made them successful to new generations of agents. As a result, this computerized process adapts and refines its operation based on current market conditions and past performance of the agents to provide a constantly evolving and fluid investment management system that reinforces success and discourages failure. The present invention, therefore, can aide fund managers, institutional investors and individual investors in the management their investments.

Figure 1:
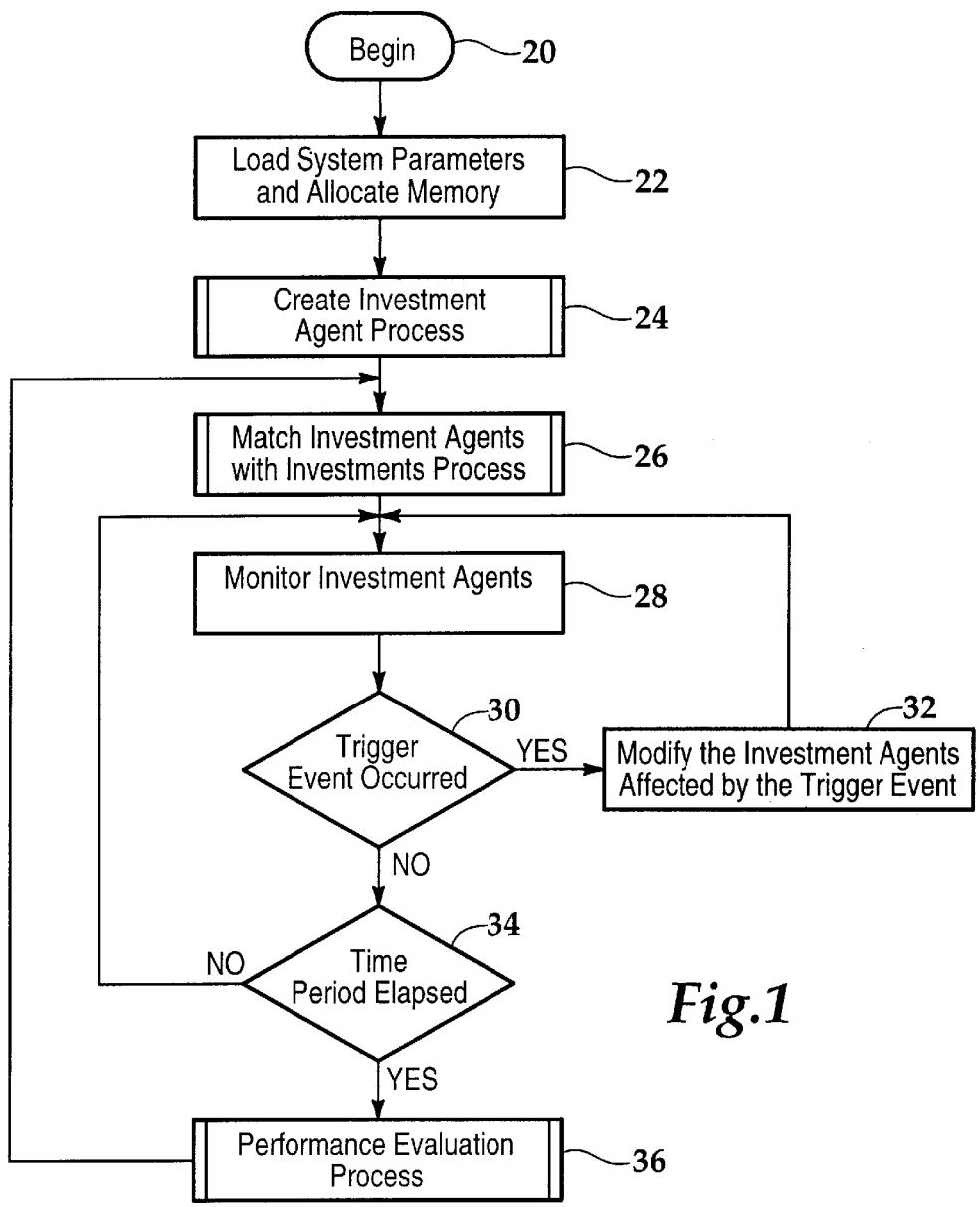
FIG. 1 is a flow chart of the overall system in accordance with a preferred embodiment of the present invention.

Now referring to FIG. 1, the flow chart of the overall system in accordance with a preferred embodiment of the present invention will now be described. Processing begins in block 20, and the system parameters are loaded and memory is allocated in block 22. Next, the investment agents are created in the Create Investment Agent Process of block 24, which will be described in greater detail with reference to FIG. 2. The investment agents are then matched with an investment in the Match Investment Agents with Investments Process of block 26, which will be described in greater detail with reference to FIG. 3. The investment agents are then monitored in block 28. If a trigger event has occurred, as determined in decision block 30, the investment agents affected by the trigger event are modified in block 32 and processing returns to block 28 where the investment agents are monitored. A trigger event may be a specified change in market conditions, such as the value of particular investment dropping more than a specified amount during a given time period or a specified drop in market benchmarks, e.g., the Dow Jones Industrial Average or the Standard & Poors 500. In block 32, the modifications may include simply notifying the operator, buying additional quantities of the investment to hedge losses, or totally selling the investment. Accordingly, the modifications made after a trigger event in block 32 will vary depending of the trigger event, the investment, and the investment strategy of the operator.

If, however, a trigger event has not occurred and the evaluation time period has not elapsed, as determined in decision block 34, processing returns to block 28 where the investment agents are monitored. If, however, the evaluation time period has elapsed, the Performance Evaluation Process begins in block 36, which will be described in greater detail with reference to FIG. 4, and processing returns to the Match Investment Agents with Investments Process in block 26. Processing continues in this manner until a runtime function or interrupt handler is received, such as a stop 38, restart 40, error handler 42, modify system parameters 44, manual modification 46 or report generation command 48. These runtime functions and interrupt handlers provide the user interface to the present invention.

The evaluation time period can be of essentially any duration that satisfies the overall investment strategy. For example, it may be undesirable to have a large turnover due to the commissions involved in the sale and purchase of the investments. Moreover, certain investments do not need to be evaluated as often, such as annuities.

In addition, the present invention may be configured to run continuously, periodically or manually depending on various criteria, such as the volatility of the investments being purchased, the desired sensitivity to the market, the maximum allowed turnover of investments and the investment goals of the operator. For example, if the sole investment type of the present invention is stocks, the present invention might be configured to run continuously (in "real-time") or more often than if the sole investments are annuities. Similarly, if the present invention uses several types of investments, it might be configured to run daily after the close of the markets, weekly or even monthly. This reduces the sensitivity of the process by removing the volatility of real-time trading.

Alternatively, the present invention may be configured to automatically stop after the Match Investment Agents with Investments Process 26 is complete. In such a case, the operator could periodically run the Performance Evaluation Process 36 followed by the Match Investment Agents with Investments Process 26 to update the investment agents.

Figure 2:
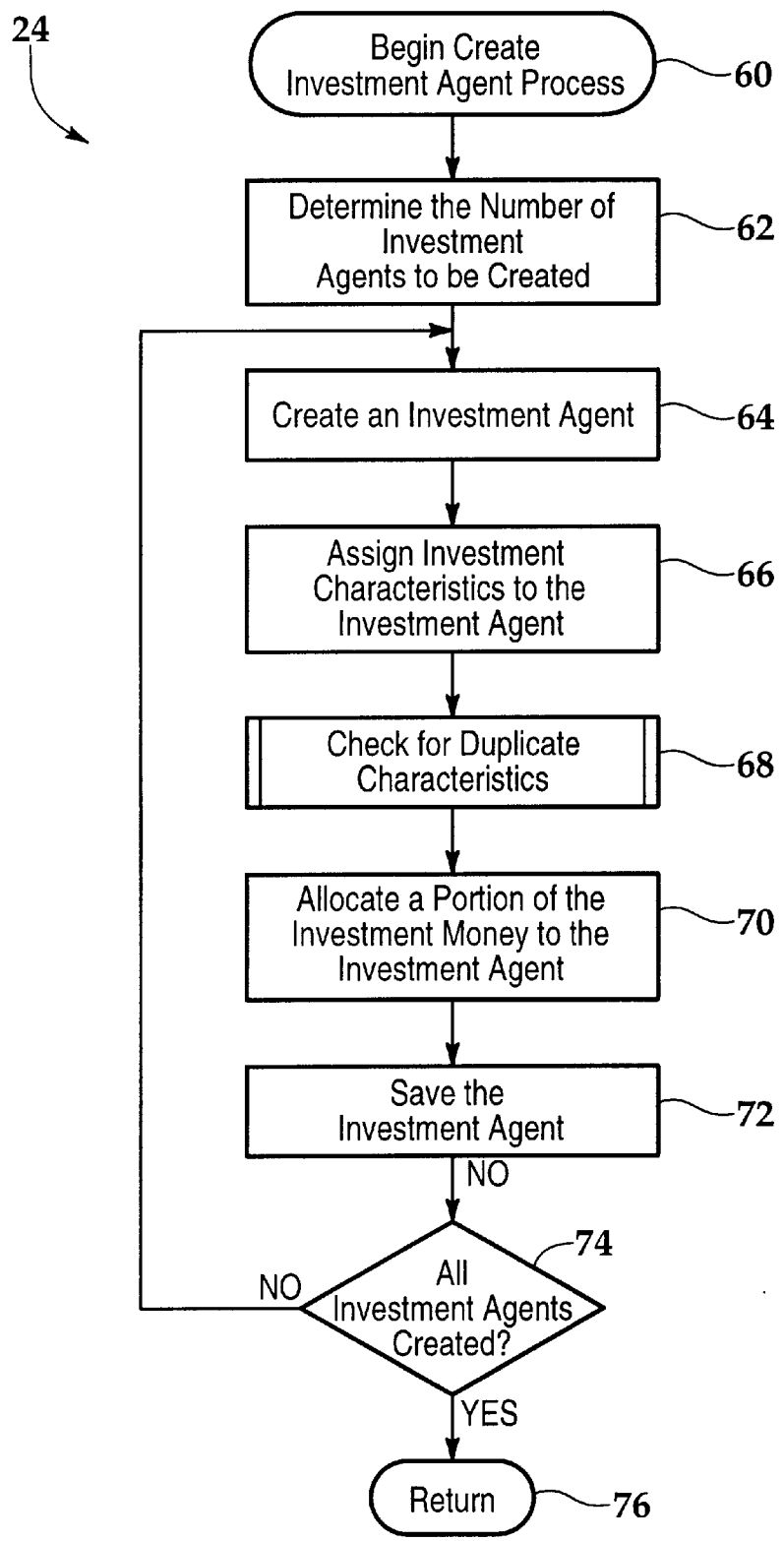
FIG. 2 is a flow chart of the create investment agent process in accordance with a preferred embodiment of the present invention.

Now referring to FIG. 2, the Create Investment Agent Process 24 will be described and begins in block 60. The number of investment agents to be created is determined in block 62. The number of investment agents should be large enough to provide diversity, effective competition between the investment agents and reduce risk, but could be as few as three. As a result, the number of investment agents could be three, ten, thirty, one hundred, five hundred or more depending on the processing capabilities of the computer, the characteristics available from the database, the total amount of money to be invested, and other factors. The total amount of money to be invested may determine the number of investment agents because the amount of money allocated to each investment agent should be large enough to allow for efficient trading of the potential investments. For example, if the investment agents are expected to invest in high priced equities, the amount of money allocated to an agent should be enough to purchase a high priced stock in round lots, e.g. 100 shares at $150 per share equals $15,000.

Next, an investment agent is created in block 64 and is defined by one or more characteristics in block 66. The number of characteristics for each investment agent may vary depending on the investment type, the data available in the database, capabilities of the computer and other such factors. Thus the number of characteristics can be six, thirty, one hundred or more. The characteristics can be randomly determined or preselected by the investment manager. Although these characteristics can be represented in many ways, the preferred embodiment of the present invention represents these characteristics as a string of alphanumeric characters wherein a "1" represents the presence of the condition, a "0" represents the absence of the condition, and a "#" represents neither the presence or absence of the condition. For example, an agent's characteristics might be 10#011##1. The "1" in the first position could represent a price to earnings ratio less than the market average, the "0" in the second position could represent a market capitalization less than $500,000,000, the "#" in the third position could represent that trading volume in the last week above or below the weekly average for the last 30 weeks is not relevant for this agent, etc.

Next, the Check for Duplicate Characteristics is performed in block 68. This process prevents the investment agents from having exactly the same characteristics of previously created investment agents. Now briefly referring to FIG. 6, the Check for Duplicate Characteristics will be described and begins in block 200. The characteristics of the current investment agent are compared to the characteristics of all other investment agents in block 202. If the characteristics of the current investment agent are not found in another investment agent, as determined in decision block 204, processing returns in block 206. If, however, the characteristics of the current investment agent are found in another investment agent, new characteristics are assigned to the investment agent in block 208 and these new characteristics are checked by looping back to block 202.

Now referring back to FIG. 2, a portion of the total money to be invested is allocated to the investment agent. Preferably, the portions allocated to each investment agent will be equivalent so that the performance of the investment agents may be more easily compared in later processes. The investment agent is then stored in block 72. If all the investment agents have been created, as determined in decision block 74, processing returns in block 76. If, however, all the investment agents have not been created, processing loops back to block 64 to create the next investment agent.

Figure 3:
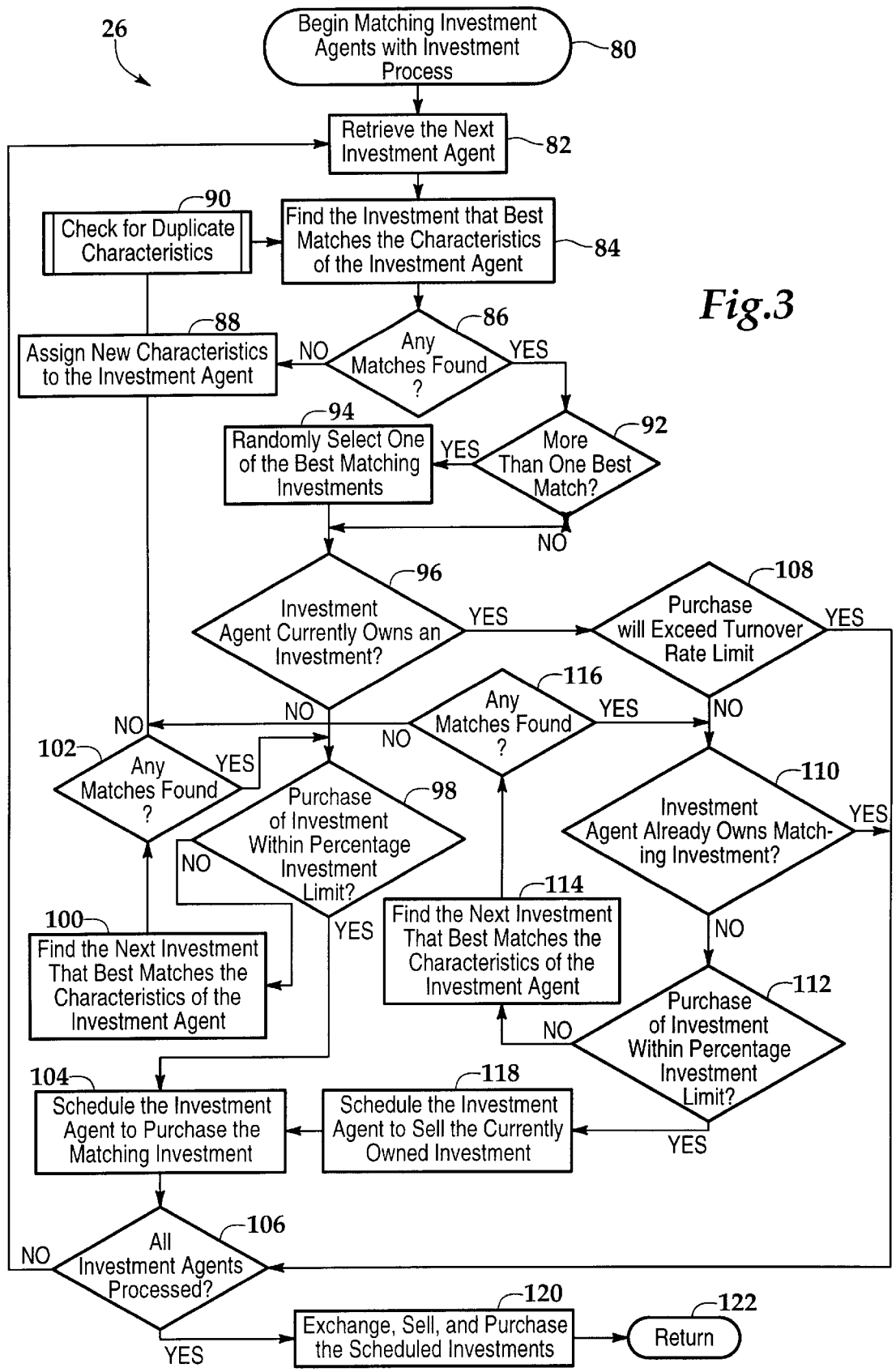
FIG. 3 is a flow chart of the matching investment agents with investments process in accordance with a preferred embodiment of the present invention.
Figures 6, 7:
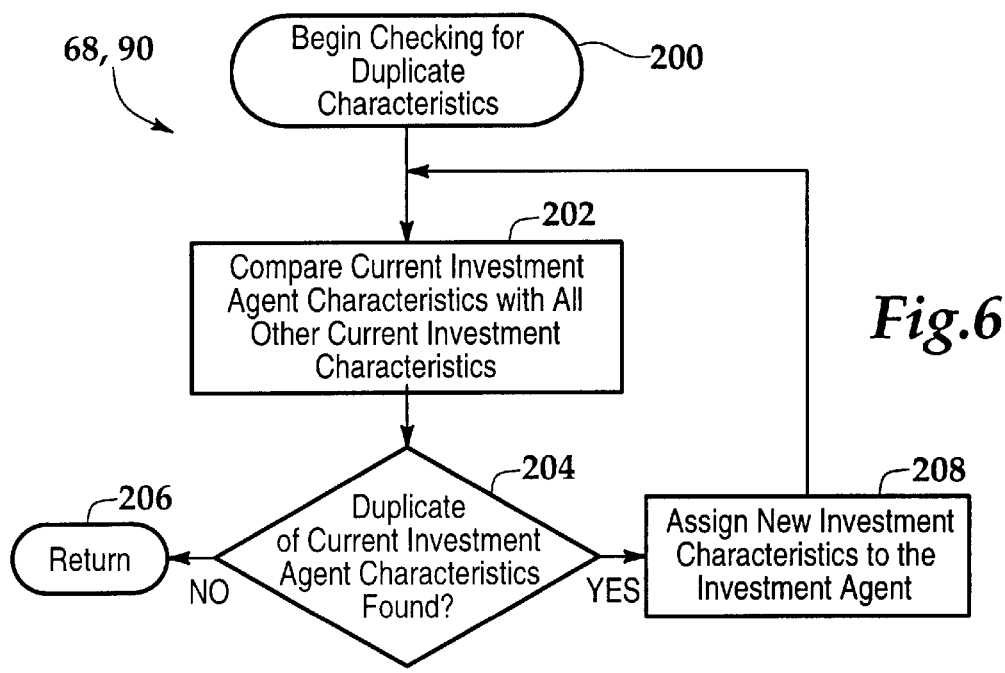
FIG. 6 is a flow chart of the checking for duplicate characteristics process in accordance with a preferred embodiment of the present invention.
FIG. 7 is an example of matching the investment agents with the investments process in accordance with a preferred embodiment of the present invention.

Referring now to FIG. 3, the Matching Investment Agents with Investments Process 26 will be described and begins in block 80. The first investment agent to be matched with an investment is retrieved in block 82. Next, the investment or investments that best match the characteristics of the investment agent are found in block 84. Typically, the investments have characteristics that correspond to those of the investment agents and are stored in a database. Alternatively the characteristics could be set up such that the characteristics in the database do not have to exactly match those of the investment agents. The investments do not have to be of the same type or in the same physical database. For example, there could be one database containing stocks and yet another for bonds, mutual funds, annuities, etc. In either case, the investment having characteristics that most closely matches the characteristics of the investment agent is associated with that agent. A brief example is illustrated in FIG. 7 wherein the Investment Agent 210 is to be matched with either Investment "A" 212, Investment "B" 214 or Investment "C" 216. During this matching process, the characteristics should match exactly. Although investments of the same type, such as stocks, will typically not have any characteristics equal to #, but #'s may be necessary when investments of different types are combined in a single database. Investment Agent 210 is shown to have characteristics 10#011##1 and Investment "A" 212 is shown to have characteristics 100101101. When these characteristics are compared, four (4) matches are found in positions one, two, six and nine. Investment "B" 214 is shown to have characteristics 100010011. When these characteristics are compared to the characteristics of Investment Agent 210, five (5) matches are found in positions one, two, four, five and nine. Investment "C" 216 is shown to have characteristics 011000101. When these characteristics are compared to the characteristics of Investment Agent 210, two (2) matches are found in positions four and nine. Investment "B" 214, therefore, is the best match for Investment Agent 210 because they have the highest number of characteristics in common.

Now referring back to FIG. 3, if no matches were found, as determined in decision block 86, new characteristics are assigned to the investment agent in block 88 and the Check for Duplicate Characteristics is performed in block 90. See FIG. 6 for a description of this process. Processing then loops back to block 84 where a new investment match is found for the investment agent. If, however, matches were found, as determined in block 86, decision block 92 determines whether more than one best match was found, e.g. three different investments have the same number of common characteristics as the investment agent. If more than one match is found, one of the best matching investments is randomly selected in block 94.

If only one match is found, as determined in decision block 92, or one of the best matching investments is selection in block 94, the present invention determines whether the investment agent currently owns an investment in decision block 96. If the investment agent does not currently own an investment, the present invention determines whether the purchase of the matching investment is within percentage investment limits in decision block 98. For example, it is common for mutual funds to limit the amount invested in a single investment to five percent. Moreover, there are certain SEC reporting requirements for investments exceeding a certain percentage of outstanding stock. Accordingly, the percentage investment limits are set by the operator and may include other parameters, such as a maximum percentage of investments in any given industry sector or capital gains considerations. If the purchase of the matching investment is not within percentage investment limits, the next best investment is selected in block 100. If no matches are found, as determined in decision block 102, new characteristics are assigned to the investment agent in block 88 and processing continues as previously described. If, however, additional matches were found, processing loops back to block 98 where the purchase of the newly selected investment is checked for compliance with percentage investment limits. If, however, the purchase of the matching investment is within percentage investment limits, as determined in decision block 98, the investment agent is scheduled to purchase the matching investment in block 104. If there are more investment agents to process, as determined in decision block 106, processing loops back to block 82 where the next investment agent is retrieved.

If, however, the investment agent currently owns an investment, as determined in decision block 96, the present invention determines whether the purchase will exceed the turnover rate limit in decision block 108. This is an optional check designed to allow the operator to control investment turnover and thus contain transaction costs. If the purchase will not exceed the turnover rate limit, the present invention determines whether the investment agent already owns the matching investment in decision block 110. Note that the rating of the matching investment must exceed that of the current investment before the current investment will be sold. If the investment agent does not already own the matching investment, the present invention determines whether the purchase of the investment is within percentage investment limits in decision block 112. If the purchase of the investment is not within percentage investment limits, the next best investment is selected in block 114. If no matches are found, as determined in decision block 116, new characteristics are assigned to the investment agent in block 88 and processing continues as previously described. If, however, additional matches were found, processing loops back to block 110 where the present invention determines whether the investment agent already owns the matching investment. If, however, the purchase of the matching investment is within percentage investment limits, as determined in decision block 112, the investment agent is scheduled to sell the currently owned investment in block 118 and purchase the matching investment in block 104. If there are more investment agents to process, as determined in decision block 106, processing loops back to block 82 where the next investment agent is retrieved. If, however, all the investment agents have been processed, the present invention exchanges, sells and purchases the scheduled investments in block 120 and processing returns in block 122. These transactions can be performed through a brokerage house, electronic trading or other means to carry out the transaction. Exchanges occur when a particular investment is sold by one investment agent and purchased by another investment agent. This is maintained as a "paper" transaction so that transaction costs can be reduced.

Figure 4:
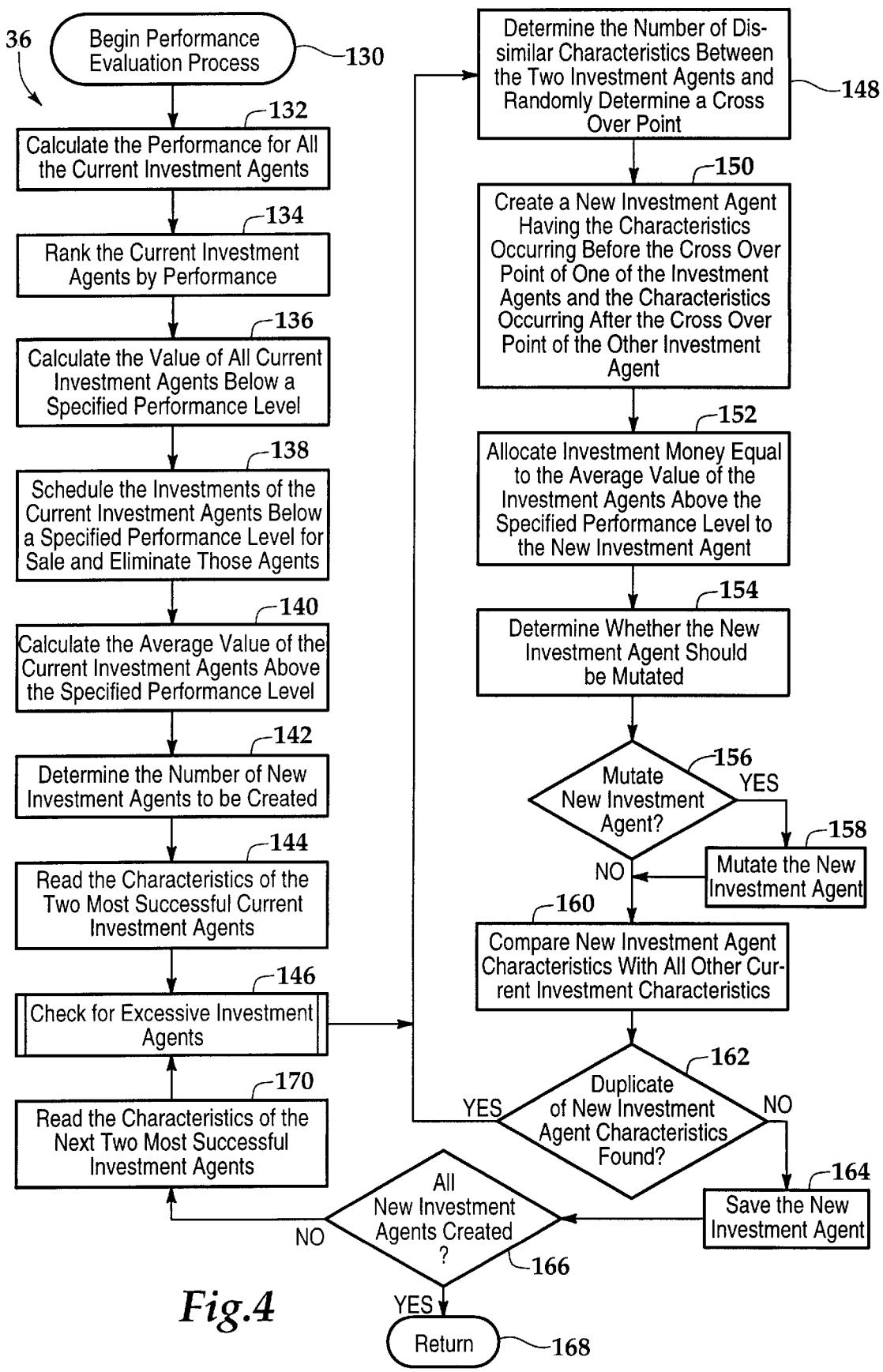
FIG. 4 is a flow chart of the investment agent evaluation process in accordance with a preferred embodiment of the present invention.

Now referring to FIG. 4, the Performance Evaluation Process 36 will be described and begins in block 130. The performance for all the current investment agents is determined in block 132. Typically, performance is calculated by the overall return of the investment including price appreciation, dividends, interest earned and stock splits. The investment agents are then ranked by performance in block 134. Note that the relative performance of the agents can be based only on investments of the same type. For example, the general rule is that a stock will outperform a bond, but certain percentage of bonds in the overall fund may be desirable to reduce the overall risk. During the evaluation, the pool percentages for each investment type could be adjusted either manually or automatically. An automatic adjustment may be triggered by specified parameters. Thus the overall pool can be first split into investment types and then each of these sub-pools can be used to each type of investment.

Next, the value of all current investment agents below a specified performance level is calculated in block 136. The specified performance level can be a rate of return or a performance ranking of the investment agents. The investments of the current investment agents below the specified performance level are scheduled for sale and those investment agents are eliminated in block 138. The average value of the current investment agents above the specified performance level are calculated in block 140. The number of new investment agents to be created is then calculated in block 142 by dividing the value of the investment agents that were below the specified performance level and eliminated by the average value of the current investment agents above the specified performance level. Other formulas may be used.

Figure 5:
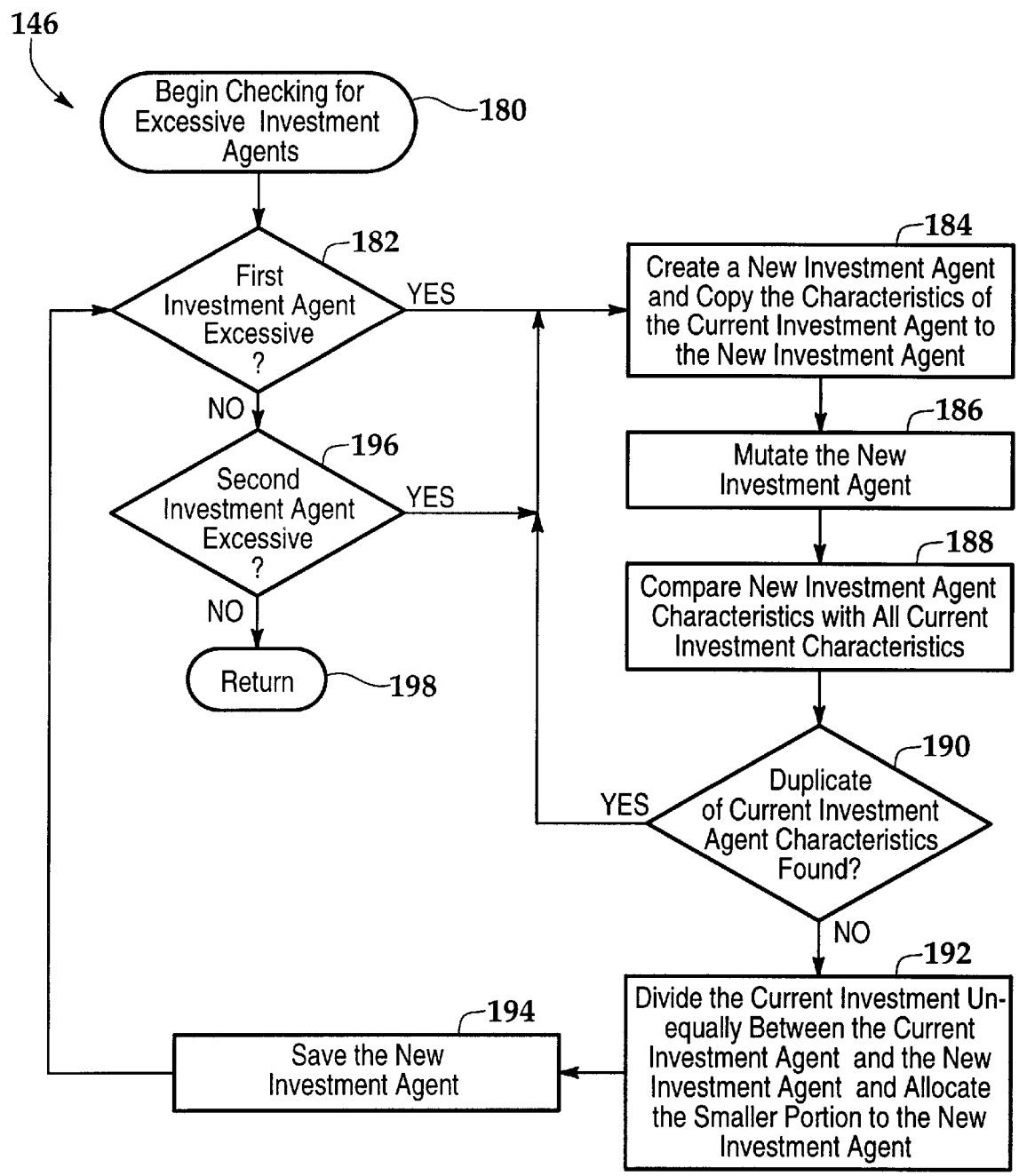
FIG. 5 is a flow chart of the checking for excessive investment agents process in accordance with a preferred embodiment of the present invention.

Next, the characteristics of the two most successful investment agents are retrieved in block 144 and the Check for Excessive Investment Agents is performed in block 146, which will be further described in reference to FIG. 5. The number of dissimilar characteristics between the two investment agents is determined and a cross over point is randomly determined in block 148. A new investment agent having the characteristics occurring before the cross over point of one of the investment agents and the characteristics occurring after the cross over point of the other investment agent is created in block 150. An example of this process is illustrated in FIG. 8.

Now briefly referring to FIG. 8, the characteristics of Investment Agent One 220 and Investment Agent Two 222 will used to create New Investment Agent 224. The number of dissimilar characteristics are determined, including any characteristic containing a #. Accordingly, there are six dissimilar characteristics between Investment Agent One 220 and Investment Agent Two 222 (characteristics two, three, five, six, seven and nine). The cross over point 226 is randomly determined to split the dissimilar characteristics. Otherwise, the New Investment Agent 224 could be identical to Investment Agent One 220 or Investment Agent Two 222. For example, if the cross over point 226 were positioned between characteristic one and two, the New Investment Agent 224 would be identical to Investment Agent Two 222. The cross over point 226 allows the emergence of particularly successful investment agents based on a series of characteristics. Moreover, the use of only one cross over point 226 increases the chance of perpetuating successful strings of characteristics. The New Investment Agent 224 is then created using the characteristics of Investment Agent One 220 that occur before the cross over point 226 and the characteristics of Investment Agent Two 222 that occur after the cross over point 226. Thus the New Investment Agent 224 has characteristics 10#0000##. Note that the characteristics of Investment Agent One 220 that occur after the cross over point 226 and the characteristics of Investment Agent Two 222 that occur before the cross over point 226 could also be used to create a New Investment Agent 224 having characteristics 111011##1.

Now referring back to FIG. 4, investment money from the scheduled sale of the eliminated agents equal to the average value of the investment agents above the specified performance level is allocated to the new investment agent in block 152. Next, the present invention determines whether the new investment agent should be mutated in block 154. If the new investment agent is to be mutated, as determined in decision block 156, the new investment agent is mutated in block 158. The number of mutations allowed should be extremely small. Mutating a new investment agent introduces combinations of characteristics not found in the original mix. The mutation may change, add or delete a characteristic of the new investment agent. Thus the mutated new investment will succeed or fail based on the competitiveness of the mutation. An example of a mutation is illustrated in FIG. 9.

Now referring briefly to FIG. 9, one of the characteristics of the New Investment Agent 230 is randomly picked to be mutated. In this example, characteristic five is mutated. Mutation One 232 illustrates one possible mutation by changing characteristic five from a 0 to a 1. Similarly, Mutation Two 234 illustrated another possible mutation by changing characteristic five from a 0 to a #. Although it is preferable to only mutate only one characteristic, certain investment strategies may warrant the mutation of additional characteristics.

Referring back to FIG. 4, if the new agent is not to be mutated, as determined in decision block 156, or the new investment agent has already been mutated in block 158, the characteristics of the new investment agent are compared with the characteristics of all the other investment agents in block 160. If a duplicate of the new investment characteristics is found, as determined in decision block 162, the new agent is recreated by looping back to block 148 and repeating the process as previously described. If, however, a duplicate is not found, the new investment agent is saved in block 164. If all the new investment agents have been created, as determined in decision block 166, processing returns in block 168. If, however, all the new investment agents have not been created, the characteristics of the next two most successful investment agents are read in block 170 and processing loops back to block 146 to repeat the previously described process.

Now referring to FIG. 5, the Check for Excessive Investment Agents 146 will be described and begins in block 180. The first investment agent is checked for excessive value in decision block 182, which is typically a value that far exceeds the average value of the successful investment agents. For example, a value of three or four times the average value of the successful agents may be considered excessive. If the first investment agent is excessive, a new investment agent is created by copying the characteristics of the first investment agent in block 184 and the new investment is mutated in block 186 using the process previously described. The characteristics of the new investment agent are then compared with the characteristics of all the other investment agents in block 188. If a duplicate of the new investment characteristics is found, as determined in decision block 190, the new agent is recreated by looping back to block 184 and repeating the process as previously described. If, however, a duplicate is not found, the current investment is unequally divided between the current investment agent and the new investment agent with the smaller portion being allocated to the new investment agent in block 192 and the new investment agent is saved in block 194. Processing then loops back to decision block 182 to check the first investment agent again. If, however, the first agent is not excessive, as determined in decision block 182, the second investment agent is checked in decision block 196. If the second investment agent is excessive, the process loops back to block 184 where a new investment agent is created as previously described. If, however, the second investment agent is not excessive, processing returns in block 198.

Although preferred embodiments of the invention have been described in detail, it will be understood by those skilled in the art that various modifications can be made therein without departing from the spirit and scope of the invention as set forth in the appended claims.

What is claimed is:

1. A method for managing three or more investments, each investment having one or more characteristics, the method comprising the steps of:
   (a) creating three or more investment agents, each investment agent having one or more characteristics;
   (b) selecting an investment for each investment agent by comparing the investment agent's one or more characteristics to the investment's one or more characteristics;
   (c) acquiring the selected investment for each investment agent if the selected investment is not currently owned by the investment agent;
   (d) after a period of time has elapsed, managing the selected investments by:
      (d1) evaluating the performance of each investment agent,
      (d2) eliminating each investment agent whose performance is less than a specified performance level and scheduling the selected investment for each eliminated investment agent for sale, and
      (d3) creating one or more new investment agents, each new investment agent having one or more characteristics derived from two or more of the investment agents whose performance is equal to or greater than the specified performance level; and
   (e) repeating steps (b) and (c).

2. The method for managing three or more investments, as recited in claim 1 wherein step (e) comprises repeating steps (b), (c) and (d) until management of the three or more investments is not required.

3. The method for managing three or more investments, as recited in claim 1 wherein the selected investment is acquired by transferring the selected investment from one of the investment agents to another of the investment agents.

4. The method for managing three or more investments, as recited in claim 1 wherein the selected investment is acquired by purchasing the selected investment.

5. The method for managing three or more investments, as recited in claim 1 wherein step (c) comprises acquiring the selected investment for each investment agent if the selected investment is not currently owned by the investment agent and the acquisition will not exceed an investment turnover rate limit.

6. The method for managing three or more investments, as recited in claim 1 wherein step (c) comprises acquiring the selected investment for each investment agent if the selected investment is not currently owned by the investment agent and the acquisition will not exceed a percentage investment limit.

7. The method for managing three or more investments, as recited in claim 1 wherein the performance of each investment agent is evaluated by calculating the overall return for the investment currently owned by the investment agent.

8. The method for managing three or more investments, as recited in claim 1 wherein the one or more characteristics of the investments and investment agents are represented by one or more alphanumeric characters, each alphanumeric character indicating either the absence of a condition, the presence of the condition, or that the condition is irrelevant.

9. The method for managing three or more investments, as recited in claim 1 wherein the specified performance level is based on a performance ranking of the three or more investment agents.

10. The method for managing three or more investments, as recited in claim 1 wherein the specified performance level is a specific rate of return.

11. The method for managing three or more investments, as recited in claim 1 wherein a small percentage of the new investment agents are mutated by randomly modifying one or more of the new investment agent's characteristics.

12. The method for managing three or more investments, as recited in claim 1 wherein step (d3) comprises creating one or more new investment agents, each new investment agent having one or more characteristics derived by determining a cross over point based on the characteristics of a first and second investment agent whose performances are equal to or greater than the specified performance level, copying the characteristics occurring before the cross over point of the first investment agent to the new investment agent, and copying the characteristics occurring after the cross over point of the second investment agent to the new investment agent.

13. The method for managing three or more investments, as recited in claim 1 further comprising the step of:
   (d4) dividing the investment currently owned by the investment agent between the investment agent and a new investment agent if the value of the investment exceeds a value limit.

14. A computer program embodied on a computer-readable medium for managing three or more investments, each investment having one or more characteristics, the computer program comprising:
   a code segment for creating three or more investment agents, each investment agent having one or more characteristics;
   a code segment for selecting an investment for each investment agent by comparing the investment agent's one or more characteristics to the investment's one or more characteristics;
   a code segment for acquiring the selected investment for each investment agent if the selected investment is not currently owned by the investment agent; and
   a code segment for managing the selected investments by evaluating the performance of each investment agent, eliminating each investment agent whose performance is less than a specified performance level, scheduling the selected investment for each eliminated investment agent for sale, and creating one or more new investment agents, each new investment agent having one or more characteristics derived from two or more of the investment agents whose performance is equal to or greater than the specified performance level.

15. The computer program for managing three or more investments, as recited in claim 14 wherein the selected investment is acquired by transferring the selected investment from one of the investment agents to another of the investment agents.

16. The computer program for managing three or more investments, as recited in claim 14 wherein the selected investment is acquired by purchasing the selected investment.

17. The computer program for managing three or more investments, as recited in claim 14 wherein the performance of each investment agent is evaluated by calculating the overall return for the investment currently owned by the investment agent.

18. The computer program for managing three or more investments, as recited in claim 14 wherein the one or more characteristics of the investments and investment agents are represented by one or more alphanumeric characters, each alphanumeric character indicating either the absence of a condition, the presence of the condition, or that the condition is irrelevant.

19. The computer program for managing three or more investments, as recited in claim 14 wherein the specified performance level is based on a performance ranking of the three or more investment agents.

20. A system for managing three or more investments, each investment having one or more characteristics, the system comprising:

a computer;

means for purchasing and selling the three or more investments;

a communications link connecting the computer to the investment purchasing and selling means;

a database communicably linked to the computer for storing three or more investment agents, each agent having one or more characteristics; and a computer program resident on the computer for creating the three or more investment agents, selecting an investment for each investment agent by comparing the investment agent's one or more characteristics to the investment's one or more characteristics, acquiring the selected investment for each investment agent if the selected investment is not currently owned by the investment agent, and managing the selected investments by evaluating the performance of each investment agent, eliminating each investment agent whose performance is less than a specified performance level, scheduling the selected investment for each eliminated investment agent for sale, and creating one or more new investment agents, each new investment agent having one or more characteristics derived from two or more of the investment agents whose performance is equal to or greater than the specified performance level.

\* \* \* \* \*